United States Patent [19]
Satoh

[11] Patent Number: 5,572,556
[45] Date of Patent: Nov. 5, 1996

[54] METHOD AND SYSTEM FOR CONTROLLING OF REPRODUCTION OF SAMPLING SIGNAL

[75] Inventor: Yasuo Satoh, Tokyo, Japan

[73] Assignee: NEC Corporation, Tokyo, Japan

[21] Appl. No.: 399,546

[22] Filed: Mar. 7, 1995

[51] Int. Cl.⁶ .............................. H04L 7/00; H04L 25/36; H04L 25/40
[52] U.S. Cl. .............................................................. 375/372
[58] Field of Search ..................................... 375/372, 373, 375/375, 376, 371, 362, 355; 370/100.1, 105.3, 102

[56] References Cited

U.S. PATENT DOCUMENTS

| | | | |
|---|---|---|---|
| 5,359,605 | 10/1994 | Urbansky et al. | 375/372 |
| 5,367,545 | 11/1994 | Yamashita et al. | 375/372 |
| 5,479,457 | 12/1995 | Waters | 375/372 |

FOREIGN PATENT DOCUMENTS 61-30456  4/1979  Japan .

*Primary Examiner*—Stephen Chin
*Assistant Examiner*—Hai H. Phan
*Attorney, Agent, or Firm*—Sughrue, Mion, Zinn, Macpeak & Seas

[57] ABSTRACT

In a method of controlling reproduction of a sampling clock signal, a transmission path clock signal is extracted from the transmission signal. The transmission signal is transmitted with the transmission path clock signal and includes a digital data and a transmission frequency difference data indicative of the difference in frequency between a sampling clock signal and the transmission path clock signal on a transmitting side. The digital data is written in the buffer memory in response to the extracted transmission path clock signal. A start timing of a reproduced sampling clock signal is detected and a phase control signal is generated based on the detected start timing. A reception frequency difference data is produced indicative of a difference in frequency between the extracted transmission path clock signal and the reproduced sampling clock signal such that a frequency control signal is generated based on the transmission frequency difference data and the reception frequency difference data. The sampling clock signal reproduced in response to the phase control signal and the frequency control signal such that the digital data can be read out from the buffer memory with controlled frequency and phase.

20 Claims, 7 Drawing Sheets

Fig. 1 PRIOR ART
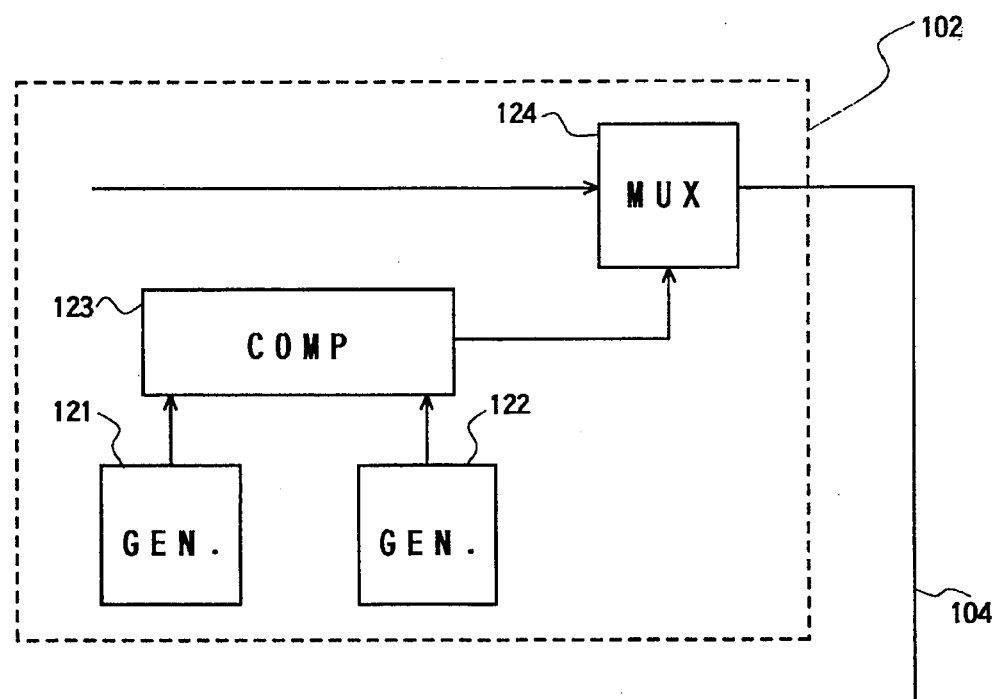
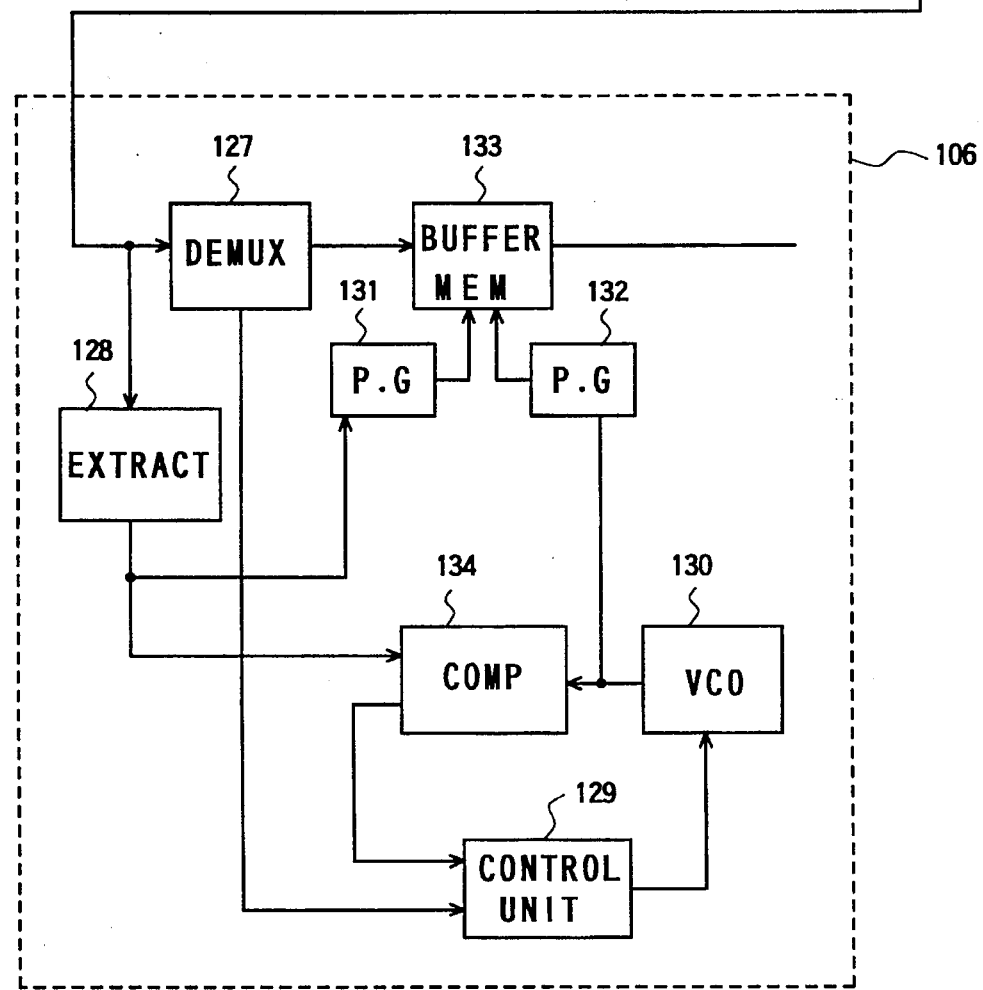

Fig. 3
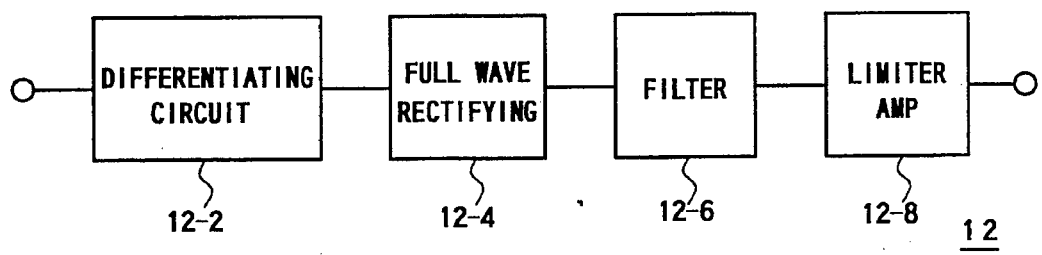
Fig. 4
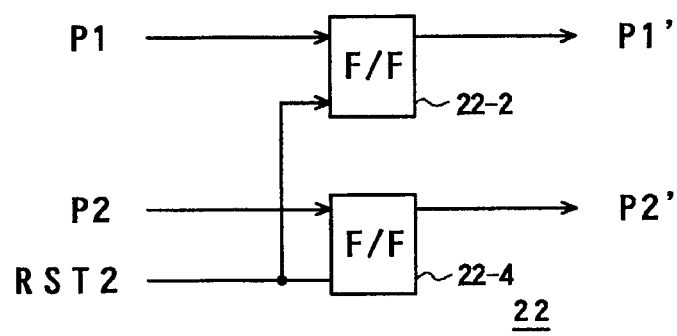
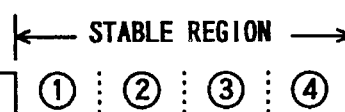

Fig.5B P1 
Fig.5C P2 
Fig.5D RST1
Fig.5E RST2 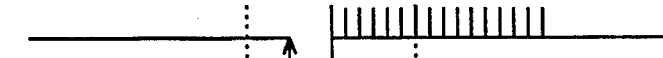

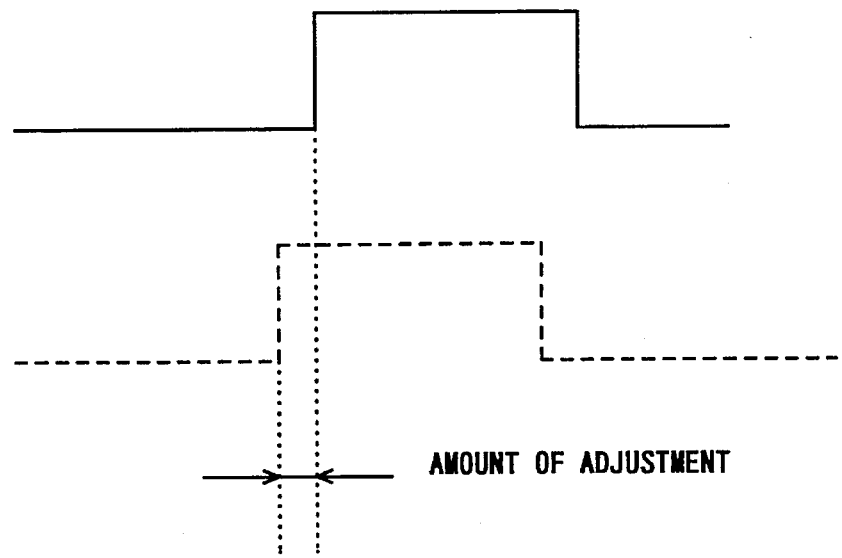
Fig. 6A
Fig. 6B
AMOUNT OF ADJUSTMENT
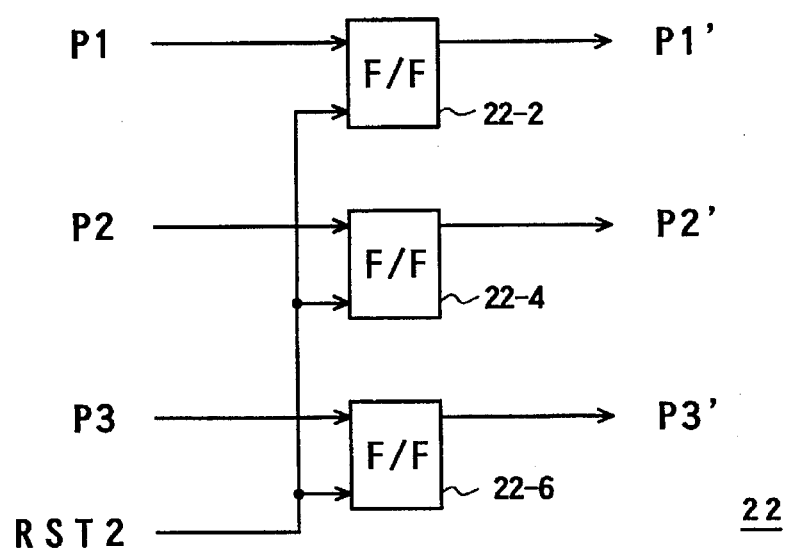
Fig. 8

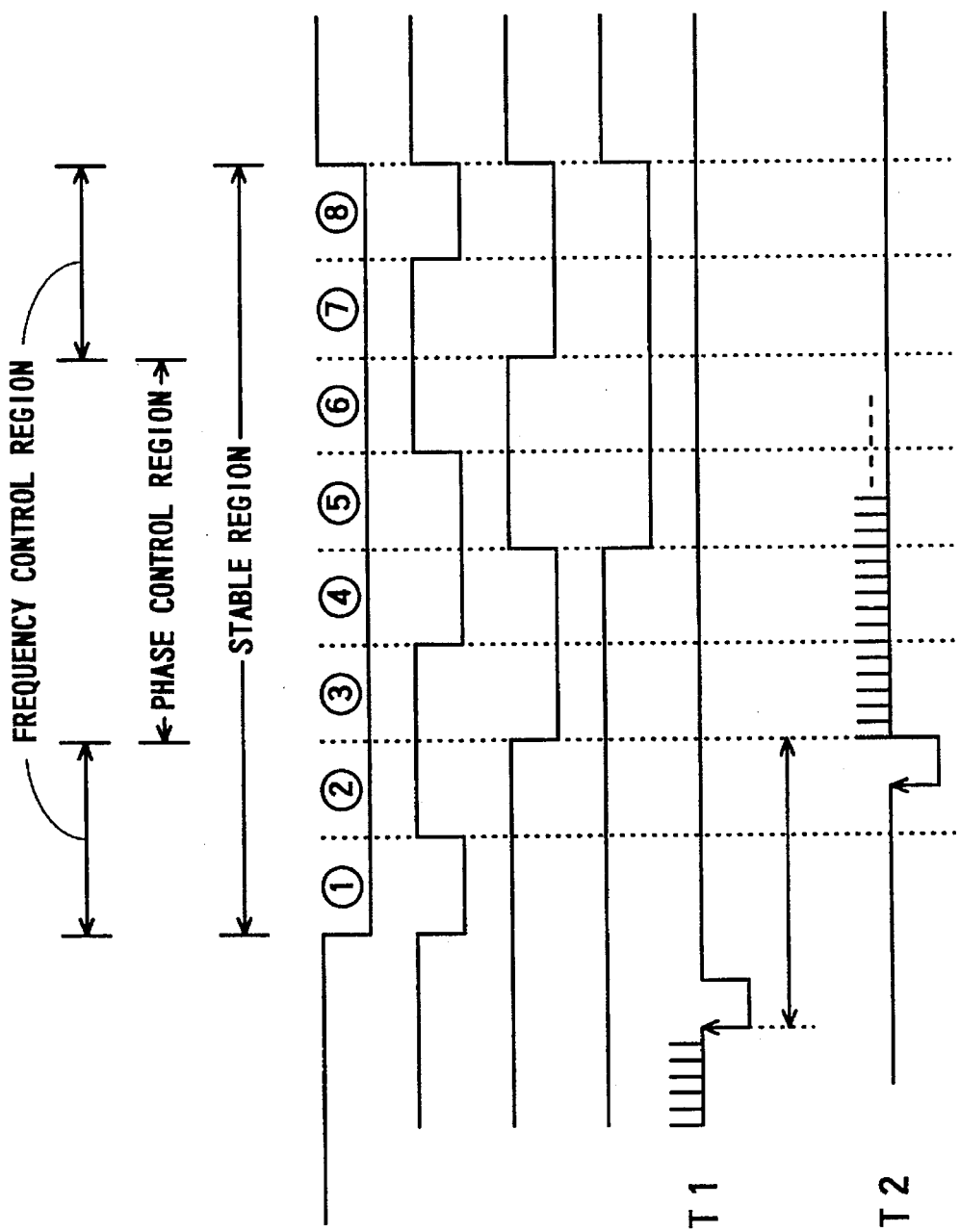

ID NO. 5,572,556

METHOD AND SYSTEM FOR CONTROLLING OF REPRODUCTION OF SAMPLING SIGNAL

BACKGROUND OF THE INVENTION

1. Field of the Invention

The present invention relates to a digital transmission system for sampling, coding and transmitting an analog signal, and more particularly, to a method and system for controlling reproduction of a sampling clock signal in the digital transmission system in which the sampling clock signal is independent of a transmission path clock signal.

2. Description of Related Art

There is a case where a sampling signal is independent of a transmission path clock signal on a digital transmission path when an analog signal is converted into a digital signal to be transmitted onto the digital transmission path. For example, in digital transmission of a television signal, a sampling signal for the television signal is often determined to be synchronous with a sync signal inherent to the television signal. In a case of a color television signal, the sampling signal is selected to have the frequency more than that of a color subcarrier signal three or four times. On the other hand, a transmission path clock signal on the digital transmission path is predetermined based on the transmission system in many cases and generally it has no relation to the sync signal of the television signal. In this manner, in a case where the sampling clock signal is independent of the transmission path clock signal, the sampling clock signal is usually aligned with the transmission path clock signal by, for example, transmitting a digitalized signal through a buffer memory. In this manner, alignment is established between the asynchronous clock signals. A buffer memory is provided on the receiving side for the same purpose. If the frequency of sampling clock signal on the transmission side does not coincide with that of sampling clock signal on the reception side, the buffer memory sometimes overflows or underflows.

For this reason, stuffing has been conventionally performed to coincide the transmission side sampling clock signal frequency with the reception side sampling clock signal frequency. However, in the conventional stuffing, since quasi-data frame near to a data frame on the transmission path is necessary, there is a problem in that the frequency of transmission path clock signal cannot be changed arbitrarily.

For this reason, a system in which the reception side sampling signal frequency can be coincided with the transmission side sampling signal frequency is disclosed in, for example, Japanese Examined Patent disclosure (JP-B2-Sho 61-30456). The system will be described below with reference to FIG. 1. The system includes a transmitting unit 102, and a transmission path 104, and a receiving unit 106.

In the transmitting unit 102, a generating circuit 121 generates a sampling clock signal and a generating circuit 122 generates a transmission path clock signal necessary to transmit data onto the transmission path 104. A comparing circuit 123 comparing the sampling clock signal with the transmission path clock signal in accordance with a predetermined algorithm to output data indicative of a difference in frequency between the sampling clock signal and transmission path clock signals. A multiplexer 124 receives codes obtained by converting an analog signal into a digital signal and then by encoding the digital signal and the frequency difference data from the comparing circuit 123 and multi- plexes them in response to the sampling clock signal. The multiplexed data is transmitted as a transmission signal on the transmission path 104 in response to the transmission path clock signal.

In the receiving unit 106, an extracting circuit 128 extracts the transmission path clock signal from the transmission signal on the transmission path 104. A pulse generating circuit 131 generates a sequence of write pulses. The sequence of write pulses is supplied to a buffer memory section 133. A demultiplexer 127 receives the transmission signal and demultiplexes the transmission signal into the digital data signal and the frequency difference signal. The data signal is supplied to the buffer memory section 133 and is stored therein in response to the write pulses from the pulse generating circuit 131.

A voltage controlled oscillating circuit (VCO) 130 generates a sampling signal control signal under control of a control unit 129. A pulse generating circuit 132 generates a sequence of read pulses as the reproduced sampling signal having the same frequency as that of the sampling signal control signal in response to the sampling signal control signal. The buffer memory section 133 reads out the stored digital data signal in response to the sequence of read pulses. A comparing circuit 134 receives the extracted transmission path clock signal from the extracting circuit 128 and the sampling signal control signal from the VCO 130 and determines a difference in frequency between the extracted transmission path clock signal and the sampling signal control signal. The control unit 129 controls the VCO 130 in accordance with the frequency difference signal from the demultiplexer 127 and the difference signal from the comparing circuit 134. In this manner, the control was performed such that the transmission side sampling signal frequency coincides with the reception side sampling signal frequency.

However, there is a problem in the conventional system in that the jitter of the reproduced sampling clock signal is great because quantization error is contained in the reproduced sampling clock signal.

SUMMARY OF THE INVENTION

Therefore, the present invention has, as an object, to provide a method and system in which the jitter can be suppressed in the reproduced sampling clock signal.

Another object of the present invention is to provide a method and system in which data can be read out in synchronous with a write operation of the data.

Further another object of the present invention is to provide a method and system in which the reproduced sampling clock signal can be controlled in frequency and phase.

In order to achieve the object, according to an aspect, a receiving apparatus according to the present invention of a transmission signal which is transmitted with a transmission path clock signal and includes a digital data and a transmission frequency difference data indicative of the difference in frequency between a sampling clock signal and the transmission path clock signal on a transmitting side, said apparatus includes a buffer memory, a write section for extracting the transmission path clock signal from the transmission signal, for generating a region indication signal from the extracted transmission path clock signal, and for writing the digital data in said buffer memory in response to the extracted transmission path clock signal, a phase control signal generating section for detecting a start timing of a read operation from the region indication signal and an input read start signal and generating a phase control signal based on the detected start timing of the read operation, a frequency control signal generating section for producing a reception frequency difference data indicative of a difference in frequency between the extracted transmission path clock signal and a reproduced sampling clock signal, and generating a frequency control signal based on the transmission frequency difference data and the reception frequency difference data, and a read section responsive to the frequency control signal and the phase control signal, for reproducing a sampling clock signal and generating a start signal to supply the generated start signal to the phase control signal generating section, and reading out the digital data from the buffer memory in response to the reproduced sampling clock signal.

According to another aspect, a method according to the present invention for receiving a transmission signal which is transmitted with a transmission path clock signal and includes a digital data and a transmission frequency difference data indicative of the difference in frequency between a sampling clock signal and the transmission path clock signal on a transmitting side, writing a buffer memory and reading the digital data with controlled frequency and phase, includes the steps of:

extracting the transmission path clock signal from the transmission signal;

writing the digital data in the buffer memory in response to the extracted transmission path clock signal;

detecting a start timing of a reproduced sampling clock signal and generating a phase control signal based on the detected start timing;

producing a reception frequency difference data indicative of a difference in frequency between the extracted transmission path clock signal and the reproduced sampling clock signal to generate a frequency control signal based on the transmission frequency difference data and the reception frequency difference data; and reproducing a sampling clock signal in response to the phase control signal and the frequency control signal such that the digital data can be read out from the buffer memory with controlled frequency and phase.

According to further another aspect, an apparatus according to the present invention for reproducing a sampling clock signal synchronous with a write operation of a digital data in a buffer with a predetermined delay in a receiving apparatus of a transmission signal which is transmitted with a transmission path clock signal and includes a digital data and a transmission frequency difference data indicative of the difference in frequency between a sampling clock signal and the transmission path clock signal on a transmitting side, said apparatus includes an extracting section for extracting the transmission path clock signal from the transmission signal, a phase control signal generating section for detecting a start timing of the sampling clock signal and generating a phase control signal based on the detected start timing and the predetermined delay, a frequency control signal generating section for producing a reception frequency difference data indicative of a difference in frequency between the extracted transmission path clock signal and a reproduced sampling clock signal, and generating a frequency control signal based on the transmission frequency difference data and the reception frequency difference data, and a reproducing section for reproducing the sampling clock signal in response to the frequency control signal and the phase control signal such that the digital data is read out from the buffer memory in synchronous with the write operation with the delay.

BRIEF DESCRIPTION OF THE DRAWINGS

FIG. 1 is a diagram showing a conventional apparatus for controlling reproduction of a sampling clock signal;

FIG. 3 is a block diagram showing an extracting circuit 12 in the apparatus shown in FIG. 2;

FIG. 4 is a block diagram showing a phase information circuit 22 in the apparatus shown in FIG. 2;

FIGS. 5A to 5E are timing charts showing pulse generating circuit 14 and 18 and a phase information circuit 22 in the apparatus shown in FIG. 2;

FIGS. 6A and 6B are diagrams showing the operation of the apparatus shown in FIG. 2;

FIG. 8 is a block diagram showing a phase information circuit 22 in the apparatus shown in FIG. 7;

FIGS. 9A to 9F are timing charts showing pulse generating circuit 14 and 18 and a phase information circuit 22 in the apparatus shown in FIG. 7.

DESCRIPTION OF THE PREFERRED EMBODIMENT

A sampling clock signal reproduction controlling apparatus according to present invention will be described below with reference to the accompanying drawings.

Figure 2:
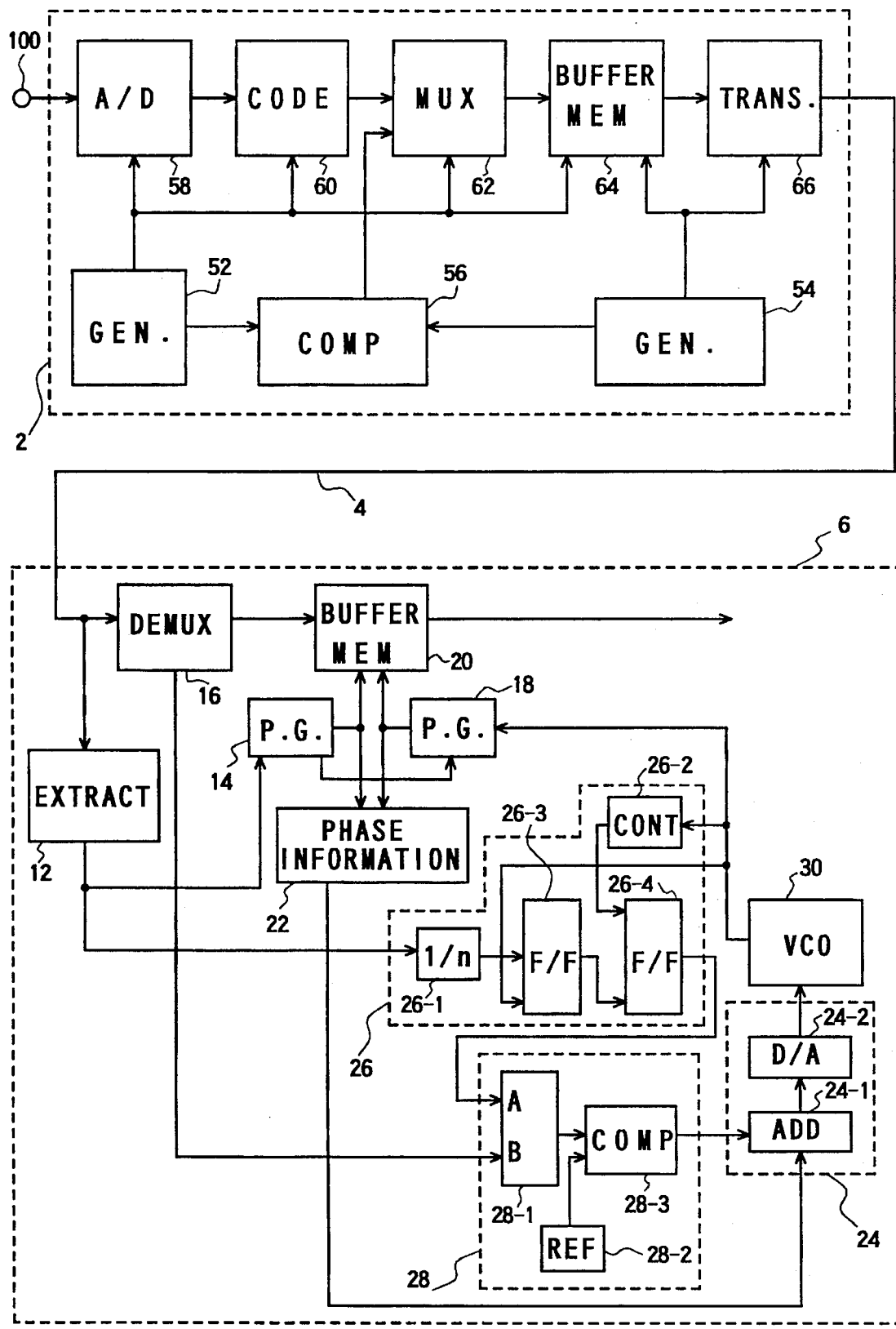
FIG. 2 is a diagram showing an apparatus for controlling reproduction of a sampling clock signal according to an embodiment of the present invention.

FIG. 2 is a block diagram showing a data transmission system including the sampling clock signal reproduction controlling apparatus according to an embodiment of the present invention. The data transmission system includes a transmission apparatus 2, a transmission path such as a cable, an electromagnetic wave, and an optical fiber, and the receiving apparatus 6.

The transmission apparatus 2 includes a generating circuit 52 for generating a sampling clock signal, a generating circuit 54 for generating a transmission path clock signal necessary to transmit data onto the transmission path 4, and a comparing circuit 56 for comparing the sampling clock signal with the transmission path clock signal in accordance with a predetermined algorithm to output data indicative of a difference in frequency between the sampling clock signal and transmission path clock signals. The transmission apparatus 2 further includes an analog-to-digital converter 60 which samples an input analog signal inputted to a terminal 100 in response to the sampling clock signal from the generating circuit 52 and converts the sampled value into a digital data. A coding circuit 62 encodes the sampled digital data into a code suitable for transmission in response to the sampling clock signal from the generating circuit 52. A multiplexer 64 receives the codes from the coding circuit 62 and the data as a transmission frequency difference data from the comparing circuit 56 and multiplexes them in response to the sampling clock signal. The multiplexed data is stored in a buffer memory section 64. A transmitting section 66 reads out the data from the buffer memory 66 in response to the transmission path clock signal and transmits it onto the transmission path 4 as a transmission signal.

The receiving circuit 6 includes an extracting circuit 12 for extracting the transmission path clock signal from the transmission signal on the transmission path 4. The extracting circuit 12 is constructed as shown in FIG. 3. The extracting circuit 12 includes a differentiating circuit 12-2 for differentiating the transmission signal and a full wave rectifying circuit 12-4 for full wave rectifying the differentiated signal. The differentiating circuit 12-2 and the full wave rectifying circuit 12-4 are a waveform converting circuit provided to readily extract the transmission path clock signal from the transmission signal. The extracting circuit 12 further includes a filter circuit 12-6 for extracting the component of the transmission path clock signal from the full wave rectified signal. In the filter circuit 12-6 a SAW filter (100 MHz to 1.6 GHz) or dielectric substance filter (2.4 to 10 GHz) is used and it has Q of about 600 to 1200. The extracted transmission path clock signal is supplied to a limiter circuit 12-8. The limiter circuit 12-8 amplifies the transmission path clock signal extracted by the filter circuit 12-6 into a predetermined amplitude. There is a case that the amplitude of the extracted clock signal is dependent upon a mark coefficient and in such a case the limiter circuit 12-8 suppresses the variation of the amplitude. If the variation of the amplitude is greater, the dynamic range of the limiter circuit 12-8 also needs to be greater. However, by employing the differentiating circuit 12-2 and the full wave rectifying circuit 12-4, the dynamic range can be narrower. The output of the extracting circuit 12 is supplied to a pulse generating circuit (PG) 14 and a difference determining circuit 26 (they will be described below) and various portions of the receiving apparatus 2.

A pulse generating circuit 14 receives the extracted transmission path clock signal from the extracting circuit 12 and generates a sequence of write pulses having the same frequency as that of the transmission path clock signal on the side of the transmitting apparatus 2, and signals P1 and P2. The circuit 12 generates a reset signal RST1 upon the end of write operation. A demultiplexer 16 receives the transmission signal and demultiplexes the transmission signal into the digital data signal and the transmission frequency difference data. The buffer memory section 20 includes a buffer memory (not shown) therein and stores the digital data signal in the buffer memory in response to the write pulses from the pulse generating circuit 14.

A voltage controlled oscillating circuit (VCO) 30 receives an oscillation control signal from a control circuit 24 and generates a generation control signal in response to the oscillation control signal. A pulse generating circuit 18 receiving the generation control signal from the VCO 30 and the reset signal RST1 from the pulse generating circuit 14 and generates a sequence of read pulses as the reproduced sampling clock signal having the same frequency as that of the generation control signal. Also the circuit 18 generates a reset signal RST2 as a start signal indicative of the start of the sampling clock signal in response to the reset signal RST1 and the generation control signal. The buffer memory 20 reads out the stored digital data signal from the buffer memory in response to the sequence of read pulses.

The difference determining circuit 26 receives the extracted transmission path clock signal from the extracting circuit 12 and the generation control signal from the VCO 30 and generates a data indicative of a difference in frequency between the extracted transmission path clock signal and the generation control signal. More particularly, the difference determining circuit 26 includes a 1/n dividing circuit 26-1, a counter 26-2, a flip-flop circuit (F/F) 26-3, and a flip/flop circuit (F/F) 26. More particularly, the counter 26-2 counts the number of pulses of the generation control signal which has the same frequency as that of the reproduced sampling clock signal. The 1/n dividing circuit 26-1 divides the extracted transmission path clock signal into a signal having a 1/n of frequency of the clock signal. The flip-flop circuit 26-3 receives the divided signal at the data terminal and the generation control signal at the clock terminal to measure one period of the divided signal. The flip-flop circuit 26-4 receives the count of the counter 26-2 at the data terminal and the output of the flip-flop circuit 26-4 at the clock terminal. As a result, the flip-flop circuit 26-4 outputs the reception frequency difference data. In this embodiment, the circuit 26 receives the generation control signal but it may receives the sampling clock pulse from the pulse generating circuit 18 in place of the generation control signal.

A state monitoring circuit 28 receives the transmission frequency difference data from the demultiplexer 16 and the reception frequency difference data from the difference determining circuit 26 and monitors the frequency of the reproduced sampling clock signal by detecting the difference between the transmission frequency difference data and the reception frequency difference data. More particularly, the circuit 28 includes a subtracting circuit 28-1, a reference data 28-2, and a comparator 28-3. The subtracting circuit 28-1 calculates the difference between A and B, i.e., (the transmission frequency difference data)–(the reception frequency difference data). The comparator 28-3 compares the calculating result with a predetermined reference data stored in the circuit 28-2. The comparator 28-3 outputs as a frequency control data the comparing result when the comparing result is equal to or greater than the reference data and outputs no data when the comparing result is smaller than the reference data.

A phase information circuit 22 receives the signals P1 and P2 as region indication signals from the pulse generating circuit 14 and the reset signal RST2 from the pulse generating circuit 18 and generates as a phase control data a data corresponding to a shift of the reproduced sampling clock signal in phase from a predetermined phase. More particularly, the circuit 22 includes two flip-flop circuits 22-2 and 22-4. The flip-flop circuit 22-2 generates a signal P1' from the signal P1 and the reset signal RST2 and the flip-flop circuit 22-4 generates a signal P2' from the signal P2 and the reset signal RST2. The phase information circuit 22 generates the position data based on the signals P1' and P2'.

The control circuit 24 receives the phase control data from the phase information circuit 22 and the frequency control data from the state monitoring circuit 28 and generates the oscillation control signal. More particularly, the control circuit 4 includes an adder 24 and a digital-to analog converter 24-2. The adder 24 adds the frequency control data and the phase control data and the converter 24-2 converts the adding result into an analog value as the oscillation control signal to supply to the VCO 30. The VCO 30 oscillates in response to the oscillation control signal. In this embodiment the phase control data is always added to the frequency control data. However, when the reset or start signal RST2 is out of the stable region, the phase control data may be not added. Or, the phase control data may be not outputted in such a case.

Figure 5A:
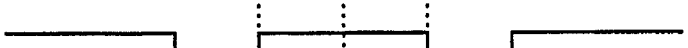
Figure 7:
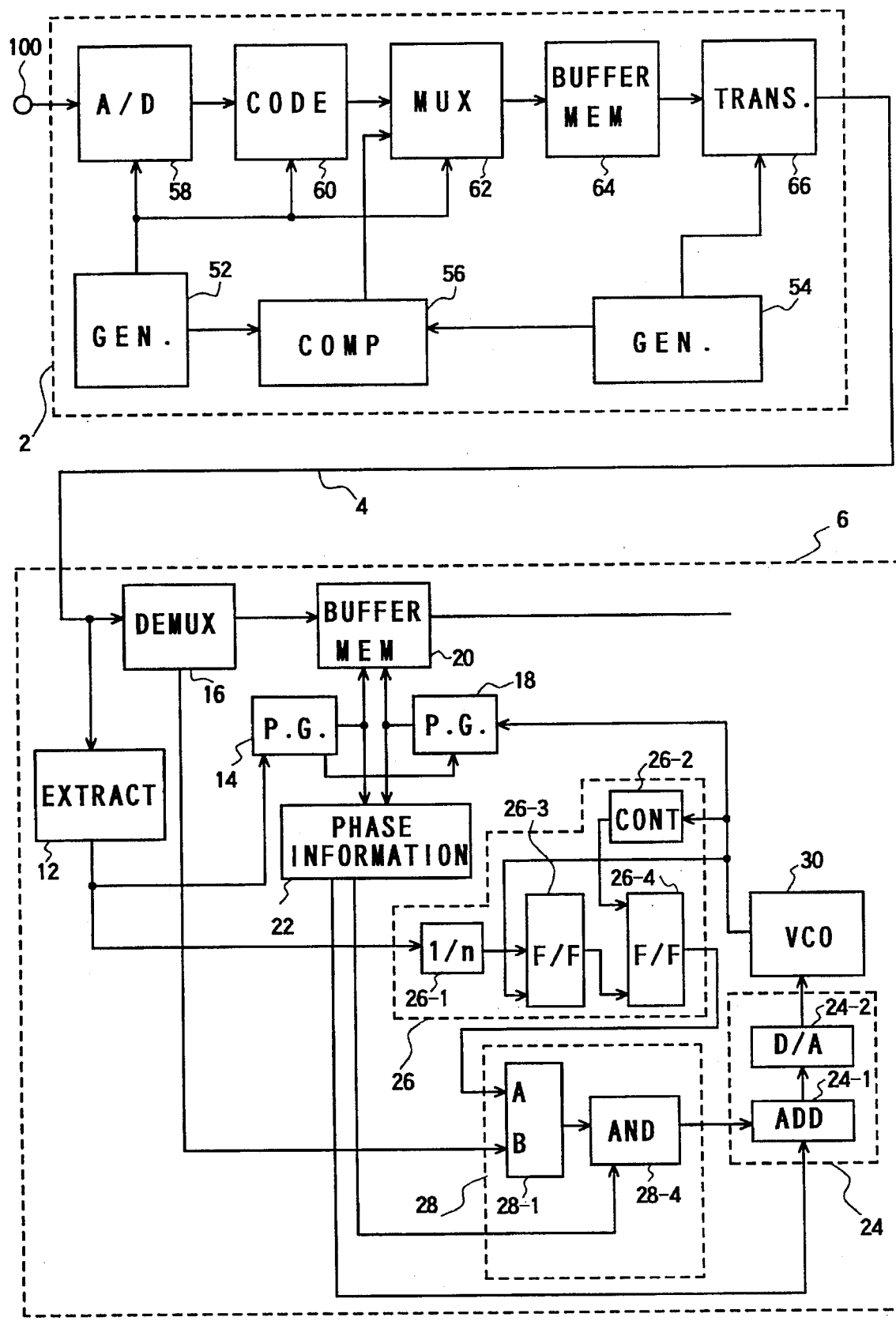
FIG. 7 is a diagram showing an apparatus for controlling reproduction of a sampling clock signal according to another embodiment of the present invention.
Figure 10:
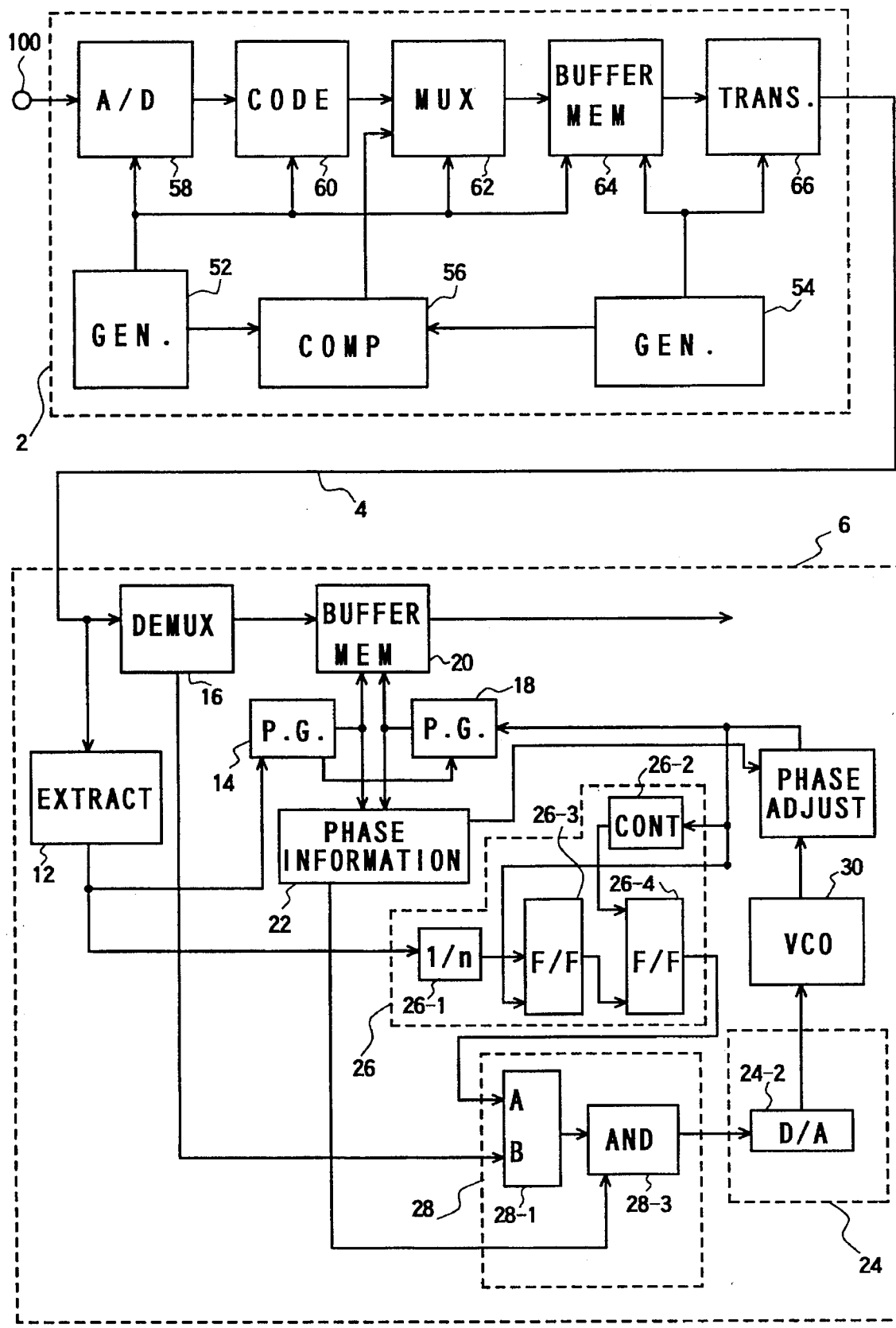
FIG. 10 is a diagram showing an apparatus for controlling reproduction of a sampling clock signal according to another embodiment of the present invention.

Next, the operation of the sampling signal reproduction control apparatus will be described below. In this embodiment, a phase control region corresponds to the stable region shown in FIG. 5A.

When a transmission signal is received from the transmission path 4, the extracting circuit 12 extracts the transmission path clock signal to supply the pulse generating circuit 14. The digital data and the transmission frequency difference data are demultiplexed by the demultiplexer 16. The digital data is supplied to the buffer memory section 20 and the transmission frequency difference data is supplied to the state monitoring circuit 28. The pulse generating circuit 14 generates a sequence write pulses having the same frequency as that of the transmission path clock signal in response to the extracted transmission path clock signal to supply to the buffer memory section 20. The demultiplexed digital data is written in the buffer memory of the buffer memory section 20 in response to the write pulses. When the data write operation is completed, the pulse generating circuit 14 generates the reset signal RST1 to supply it to the pulse generating circuit 18 as shown in FIG. 5D. In the present embodiment, the apparatus is designed such that the reset signal RST2 is generated by the pulse generating circuit 18 at the timing of the interface between the regions ② and ③ after the generation of the reset signal RST1 based on the generation control signal from the VCO 30. However, the timing of generation of the reset signal RST2 is shifted during the operation. This shift causes the jitter.

At this time, since the output from the difference determining circuit 26 is not yet present, the subtracting circuit 28-1 of the state monitoring circuit 28 outputs the transmission frequency difference signal from the multiplexer 16 with a sign. The comparator 28-3 compares the output of the subtracting circuit 28-1 with a predetermined reference data 28-2. The reference data is predetermined independent of the phase control in this embodiment. When an absolute value of the output of the subtracting circuit 28-1 is greater than the reference data 28-2, i.e., when the reproduced sampling signal does not fall within the phase control region, the comparator 28-3 outputs a data corresponding to the output of the subtracting circuit 28-1. In this case, since there is not yet present the phase control signal from the phase information circuit 22, the control circuit 24 outputs the oscillation control signal corresponding to the frequency control signal from the state monitoring circuit 28 to the VCO 30. The VCO 30 oscillates to output the generation control signal to the pulse generating circuit 18 and the difference determining circuit 26. In response to the reset signal RST1 from the pulse generating circuit 14 and the generation control signal from the VCO 30, the pulse generating circuit 18 generates a reset signal RST2 as shown in FIG. 5E and subsequently generates as the sampling clock signal a sequence of read pulses having the same frequency as that of the generation control signal. The buffer memory section 20 reads out the digital data from the buffer memory in response to the sequence of read pulses. That is, the data read operation is controlled based on the reset signal RST2.

At the same time as generation of the write pulses, the pulse generating circuit 14 generates signals P1 and P2, as shown in FIGS. 5B and 5C, to supply them to the phase information circuit 22. In the phase information circuit 22, the flip-flop circuits 22-2 and 22-4 produce signals P1' and P2' from the signals P1 and P2 and the reset signal RST2. In this case, the falling edge of the reset signal RST2 is used. The signals P1' and P2' indicates the position where the reset signal RST2 is located in the stable region. For instance, if P1' is at "H" level and P2' is also at "H" level, the reset signal RST2 is located in a region ② of the stable region. In this case, no signal is outputted from the phase information circuit 22. If P1' is at "L" level and P2' is also at "H" level, the reset signal RST2 is located in a region ① of the stable region. In this case, a signal corresponding to the distance from the interface between the regions ② and ③ to the location of the reset signal RST2 is outputted to the control circuit 24 as a phase control signal such that the reset signal RST2 is positioned on the interface between the regions ② and ③. In this case, the state monitoring circuit 28 does not output any signal because the reset signal RST2 is located in the stable region.

The reception frequency difference data is determined by the difference determining circuit 26 and outputted to the state monitoring circuit 28. The transmission frequency difference data multiplexed by the multiplexer 20 is also supplied to the circuit 28. Because the reference data 28-2 is set such that the difference of the reception frequency difference data and the transmission frequency difference data is normally smaller than the reference data 28-2, the state monitoring circuit 28 does not operate other than special case such as change of transmission path clock signal and therefore does not output the frequency control signal to the control circuit 24.

As a result, the control circuit 24 supplies the oscillation control signal to the VCO 30 based on the phase control signal from the phase information circuit 22. The VCO 30 changes the frequency of generation control signal very slightly in a region in which the change of frequency is negligible, as shown in FIG. 6. As a result, the timing of generation of the reset signal RST2 can be shifted slightly. In this manner, the timing of generation of the reset signal RST2 can be maintained in a predetermined region, resulting in eliminating the jitter.

It should be noted that the write pulse signal and the read pulse signal are signals different from the reset signal RST1 and the reset signal RST2, respectively. However, the write pulse signal and the reset signal RST1, and the read pulse signal and the reset signal RST2 are illustrated together in FIGS. 5D and 5E for convenience of illustration. FIGS. 9E and 9F to be referred later are also similar.

In the above embodiment, the stable region is the phase control region in which the phase control is performed. The frequency control is performed based on the reference data 28-2. However, the apparatus may be designed such that the reference data corresponds to the stable region. In this case, if the position of the reset signal RST2 is in the stable region, only the above-mentioned phase control is performed while if the position of the reset signal RST2 is out of the stable region, the frequency control is performed in addition to the phase control. In this case, however, only the frequency control may be performed.

Next, the sampling signal reproduction controlling apparatus according to another embodiment of the present invention will be described. The same components as in the above embodiment are assigned with the same reference numerals and the description will be omitted.

In this embodiment, the stable region is widened such that the center regions of ③ to ⑥ are the phase control region and the peripheral regions of ①,② ⑦ and ⑧ out of the center region are the frequency control region. The reset signal RST2 is designed to be positioned on the interface between the regions ④ and ⑤. The phase information circuit 22 further includes a flip-flop circuit 22-6 for producing a signal P3' from a signal P3 which is generated by the pulse generating circuit 14 together with the signals P1 and P2. Further, the phase information circuit 22 generate a frequency control execution signal from the signals P1, P2 and P3 and the reset signal RST2 when the reset signal RST2 is positioned on the regions of ①,② ⑦ and ⑧. It should be noted that the algorithm for determining the position of the reset signal RST2 is similar to that in the above embodiment. The frequency control execution signal indicates that the frequency control is to be executed and is supplied to the state monitoring circuit 28. The state monitoring circuit 28 includes a gate circuit 28-4 in place to the reference data 28-2 and the comparator 28-3. The gate circuit 28-4 supplies the difference of the reception frequency difference data and the transmission frequency difference data to the control circuit 24 as the frequency control signal in response to the frequency control execution signal. The VCO 30 oscillates in accordance with the frequency control signal and the phase control signal to generate the generation control signal. In this manner, the timing of generation of the reset signal RST2 by the pulse generating circuit 18 is controlled.

In this embodiment, the stable region is divided into two part, one being the phase control region and the other being the frequency control region. Thus, even if the frequency is changed, the stored data can be read with the correct phase and frequency.

Next, the sampling signal reproduction controlling apparatus according to another embodiment of the present invention will be described. The same components as in the above embodiment are assigned with the same reference numerals and the description will be omitted.

In this embodiment, the stable region is widened such that the center regions of ③ to ⑥ are the phase control region and the peripheral regions of ①,② ⑦ and ⑧ out of the center region are the frequency control region, like the above embodiment. The reset signal RST2 is designed to be positioned on the interface between the regions ④ and ⑤. The phase information circuit 22 generate a frequency control execution signal from the signals P1, P2 and P3 and the reset signal RST2 when the reset signal RST2 is positioned on the regions of ①,② ⑦ and ⑧. A phase adjusting circuit 32 is provided between the VCO 30 and the pulse generating circuit 18. The phase information circuit 22 supplies the phase control signal to not the control circuit 24 but the phase adjusting circuit 32 in the embodiment. The phase adjusting circuit 32 adjusts the phase in accordance with the phase control signal such that the generation control signal is supplied from the VCO 30 to the pulse generating circuit 18 with an adjusted phase. Further, in the control circuit 24, the adding circuit 24-1 is omitted and the output of the gate circuit 28-4 in the state monitoring circuit 28 is supplied to the VCO via the D/A converter 24-2 for the frequency control.

What is claimed is:

1. A receiving apparatus of a transmission signal which is transmitted with a transmission path clock signal and includes a digital data and a transmission frequency difference data indicative of the difference in frequency between a sampling clock signal and the transmission path clock signal on a transmitting side, said apparatus comprising:

a buffer memory;

write means for extracting the transmission path clock signal from the transmission signal, for generating a region indication signal from the extracted transmission path clock signal, and for writing the digital data in said buffer memory in response to the extracted transmission path clock signal;

phase control signal generating means for detecting a start timing of a read operation from the region indication signal and an input read start signal and generating a phase control signal based on the detected start timing of the read operation;

frequency control signal generating means for producing a reception frequency difference data indicative of a difference in frequency between the extracted transmission path clock signal and a reproduced sampling clock signal, and generating a frequency control signal based on the transmission frequency difference data and the reception frequency difference data; and read means responsive to said frequency control signal and said phase control signal, for reproducing a sampling clock signal and generating a start signal to supply the generated start signal to said phase control signal generating means, and reading out the digital data from said buffer memory in response to the reproduced sampling clock signal.

2. A receiving apparatus according to claim 1, wherein said phase control signal generating means includes means for detecting a start timing of a read operation from the region indication signal and an input read start signal and generating the phase control signal corresponding to a difference between the detected start timing and a predetermined timing in a phase control region when the detected start timing is shifted from the predetermined timing.

3. A receiving apparatus according to claim 1, wherein said read means includes means for changing a frequency of the sampling clock signal to be reproduced, in response to the phase control signal.

4. A receiving apparatus according to claim 1, wherein said read means includes:

means for controlling a frequency of the sampling clock signal to be reproduced, in response to the frequency control signal; and means for controlling a phase of the sampling clock signal to be reproduced, in response to the phase control signal.

5. A receiving apparatus according to claim 1, wherein said frequency control signal generating means includes means for generating the frequency control signal when a difference between the transmission frequency difference data and the reception frequency difference data is greater than a predetermined data.

6. A receiving apparatus according to claim 1, wherein said phase control signal generating means further includes:

means for determining whether or not the detected start timing is in a stable region other than a phase control region as a frequency control region, and for generating a position signal indicating that the start timing is in the frequency control region, when it is determined that the detected start timing is in the frequency control region, and wherein said frequency control signal generating means includes means for generating the frequency control signal corresponding to a difference between the transmission frequency difference data and the reception frequency difference data in response to the position signal from said phase control signal generating means.

7. A receiving apparatus according to claim 6, wherein said phase control signal generating means further includes means for inhibiting the phase control signal from being generated when it is determined that the detected start timing is in the frequency control region.

8. An apparatus for reproducing a sampling clock signal synchronous with a write operation of a digital data in a buffer with a predetermined delay in a receiving apparatus of a transmission signal which is transmitted with a transmission path clock signal and includes a digital data and a transmission frequency difference data indicative of the difference in frequency between a sampling clock signal and the transmission path clock signal on a transmitting side, said apparatus comprising:

extracting means for extracting the transmission path clock signal from the transmission signal;

phase control signal generating means for detecting a start timing of the sampling clock signal and generating a phase control signal based on the detected start timing and the predetermined delay;

frequency control signal generating means for producing a reception frequency difference data indicative of a difference in frequency between the extracted transmission path clock signal and a reproduced sampling clock signal, and generating a frequency control signal based on the transmission frequency difference data and the reception frequency difference data; and reproducing means for reproducing the sampling clock signal in response to said frequency control signal and said phase control signal such that the digital data is read out from said buffer memory in synchronous with the write operation with the delay.

9. An apparatus according to claim 8, wherein said reproducing means includes means for changing a frequency of the sampling clock signal to be reproduced, in response to the phase control signal.

10. An apparatus according to claim 8, wherein said reproducing means includes:

means for controlling a frequency of the sampling clock signal to be reproduced, in response to the frequency control signal; and means for controlling a phase of the sampling clock signal to be reproduced, in response to the phase control signal.

11. An apparatus according to claim 8, wherein said frequency control signal generating means includes means for generating the frequency control signal when a difference between the transmission frequency difference data and the reception frequency difference data is greater than a predetermined data.

12. An apparatus according to claim 8, wherein said phase control signal generating means further includes:

means for determining whether or not the detected start timing is in a stable region other than a phase control region as a frequency control region, and for generating a position signal indicating that the start timing is in the frequency control region, when it is determined that the detected start timing is in the frequency control region, and wherein said frequency control signal generating means includes means for generating the frequency control signal corresponding to a difference between the transmission frequency difference data and the reception frequency difference data in response to the position signal from said phase control signal generating means.

13. An apparatus according to claim 12, wherein said reproducing means includes means for reproducing the sampling clock signal based on only the frequency control signal when it is determined that the detected start timing is in the frequency control region.

14. A method of receiving a transmission signal which is transmitted with a transmission path clock signal and includes a digital data and a transmission frequency difference data indicative of the difference in frequency between a sampling clock signal and the transmission path clock signal on a transmitting side, writing a buffer memory and reading the digital data with controlled frequency and phase, said method comprising the steps of:

extracting the transmission path clock signal from the transmission signal;

writing the digital data in said buffer memory in response to the extracted transmission path clock signal;

detecting a start timing of a reproduced sampling clock signal and generating a phase control signal based on the detected start timing;

producing a reception frequency difference data indicative of a difference in frequency between the extracted transmission path clock signal and the reproduced sampling clock signal to generate a frequency control signal based on the transmission frequency difference data and the reception frequency difference data; and reproducing a sampling clock signal in response to the phase control signal and the frequency control signal such that the digital data can be read out from said buffer memory with controlled frequency and phase.

15. A method according to claim 14, wherein said detecting step includes detecting the start timing of the reproduced sampling clock signal from the extracted transmission path clock signal and the reproduced sampling clock signal, and said generating a phase control signal includes generating the phase control signal corresponding to a difference between the detected start timing and a predetermined timing.

16. A method according to claim 14, wherein said reproducing step includes changing a frequency of the sampling clock signal to be reproduced, in response to the phase control signal.

17. A method according to claim 14, wherein said reproducing step comprises the step of:

controlling a frequency of the sampling clock signal to be reproduced, in response to the frequency control signal; and controlling a phase of the sampling clock signal to be reproduced, in response to the phase control signal.

18. A method according to claim 14, wherein said step of generating a frequency control signal includes generating the frequency control signal when a difference between the transmission frequency difference data and the reception frequency difference data is greater than a predetermined data.

19. A method according to claim 14, wherein said step of generating a phase control signal further includes:

determining whether or not the detected start timing is in a stable region other than a phase control region as a frequency control region, and generating a position signal indicating that the start timing is in the frequency control region, when it is determined that the detected start timing is in the frequency control region, and wherein said step of generating a frequency control signal includes generating the frequency control signal corresponding to a difference between the transmission frequency difference data and the reception frequency difference data in response to the position signal.

20. A method according to claim 19, wherein said reproducing step includes controlling the reproduction of the sampling clock signal based on only the frequency control signal when it is determined that the detected start timing is in the frequency control region.

* * * * *